United States Patent [19]

Giacino

[11] 4,006,452
[45] Feb. 1, 1977

[54] ELECTRICAL ALARM DEVICE FOR MOTORCYCLES

[76] Inventor: Pierre Giacino, 91 Boulevard Longchamps, Marseille 1, France

[22] Filed: Oct. 7, 1974

[21] Appl. No.: 512,508

[30] Foreign Application Priority Data

Oct. 12, 1973 France .............................. 73.36966

[52] U.S. Cl. ............................. 340/65; 307/10 AT; 200/61.52
[51] Int. Cl.² ........................................ B60R 25/10
[58] Field of Search ................ 340/52 R, 52 H, 63, 340/65, 61, 134; 307/10 AT; 200/61.45 R, 61.52, 42 R

[56] References Cited

UNITED STATES PATENTS

| 3,673,562 | 6/1972 | Buell | 340/63 |
| 3,824,541 | 7/1974 | Nolan | 340/65 |

Primary Examiner—Alvin H. Waring
Attorney, Agent, or Firm—William Anthony Drucker

[57] ABSTRACT

For use as an anti-theft alarm for a motorcycle, an electrical alarm device has a casing for securing to the frame of the motorcycle. The casing contains a rechargeable battery, an electric horn, a mercury tilt-switch, and a key-operable switch accessible from the exterior of the casing. The circuit can be set to "live" by use of a key, and the mercury tilt-switch is so disposed in relation to the frame of the motorcycle that, when the motorcycle is raised into an upright position, the mercury tilt-switch is closed to complete the current circuit to the horn. The key-operable switch may have a second position in which it disconnects the horn circuit, and connects the battery across a current outlet in the wall of the casing, for take-off of current or for connection of means for charging the battery. The casing may include an amp-hour meter connected, in the second position of the switch, in parallel across the poles of the battery.

3 Claims, 4 Drawing Figures

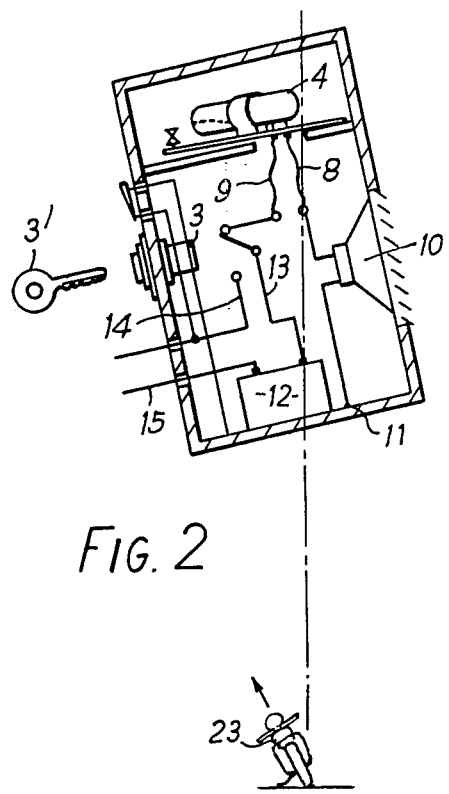
FIG. 2
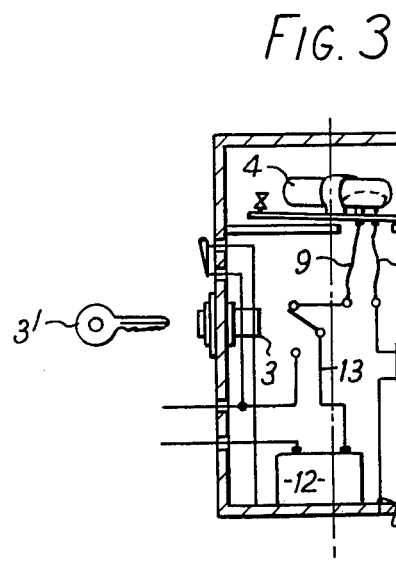
FIG. 3
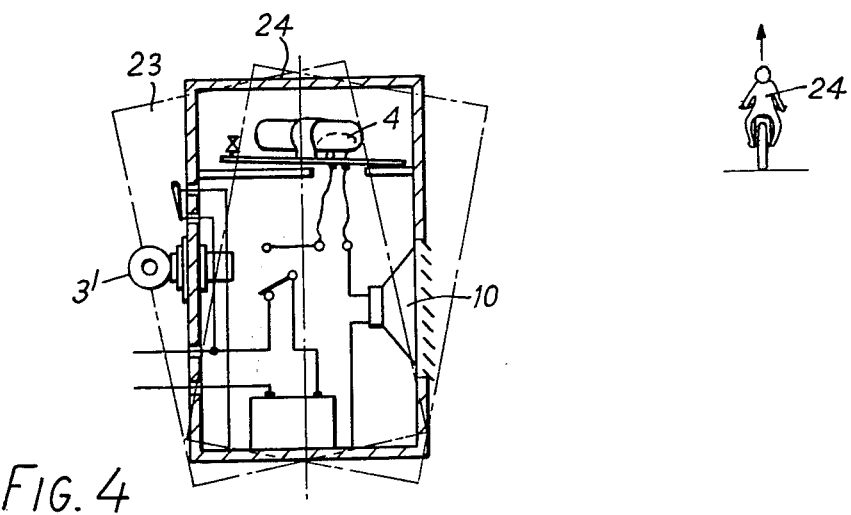
FIG. 4
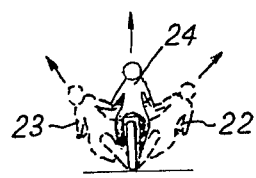

ELECTRICAL ALARM DEVICE FOR MOTORCYCLES

The subject of the invention relates to an independent alarm unit for motorcycles and all vehicles.

In known devices, pendulums and other mechanical tipping means have already been used to set off a signal when a motorcycle was moved or started; but these units, always easily accessible from outside and easily neutralised, only gave the user relative degree of security.

The device in acccordance with the invention eliminates these disadvantages and makes it possible, on basis of independently-operating, never-failing components, whose simplified internal mechanism is inaccessible to any disturbing factor, to provide complete anti-theft security.

It consists of an armoured case, small in size, containing a mercury bulb, adjusted to a point of imbalance or tipping in relation to the horizontal, which at the necessary point of imbalance to put the vehicle into a vertical position sets off an alarm supplied by an independent source of current.

In the attached drawings, given as a non-limiting example of one of the forms of embodiment of the subject of the invention:

FIGS. 2, 3, 4 show the device in its operating positions (on a smaller scale).

Figure 1:
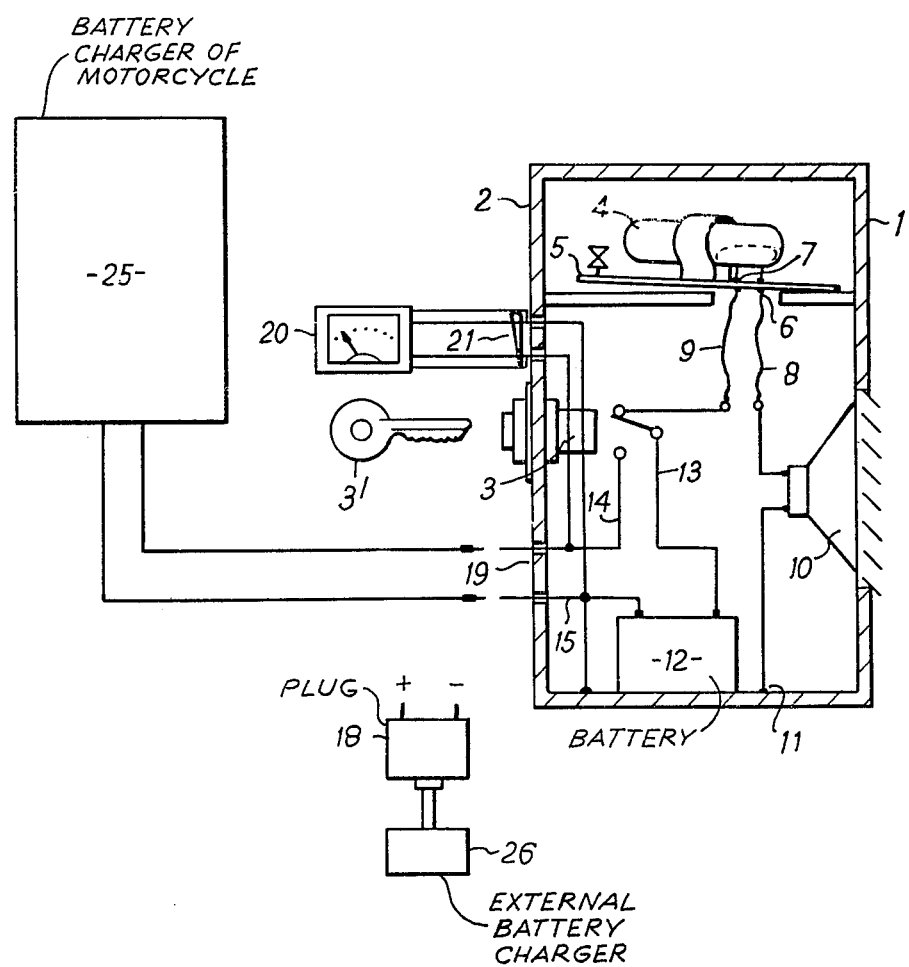
FIG. 1 shows the unit as a whole, seen in elevation and in section.

The device FIG. 1 consists of a hermetically closing case 1, its face 2 with a safety lock 3 operates by means of the key 3' as a contact/changeover switch.

This case comprises a mercury bulb 4 mounted on an adjustably slanting armature 5, with contact studs 6, 7 integral with the lines 8, 9.

Line 8 is connected to the sound signal 10 and to the mass 11.

Line 9 is connected to the accumulator 12 via the contact/changeover switch 3. The latter closes the internal circuit 11 and 13 or opens it, but when reversed closes the use or charging circuit of the motorcycle 14 and 15. This charging can be effected either by the motorcycle itself, circuit 14, 15, or by a plug 18 fitting into the point 19 to connect the accumulator to an external charger. An ammeter 20, via the circuit provided 21, makes it possible to check the charge of the accumulator 12.

When the motorcycle 23 is on its stand (FIG. 2), the bulb positioned by its base 5 is at a pre-set slant providing the circuit 6, 7 by the tipping of the mass of mercury in its "circuit-breaking" position.

If a third party straightens up the motorcycle FIG. 3, the mass of mercury closes the circuit 11 and 13 by means of the contact studs 6 and 7, and the sound emitter operates.

The alarm can be continuous in positions 22, 23, 24 of a relay isolating the circuit from the contact mass of mercury is interposed, or limited in continuity if a condenser or a diode is interposed.

The battery of the motorcycle and that of the anti-theft device can also be mounted in parallel FIG. 1 so that the ammeter 20 can show their state of charge.

The small size of this unit makes it possible to position it at any point on the motorcycle and even to integrate it into the frame.

In view of the hermetic closure of the case containing the independent alarm-triggering components, the circuit cannot be disconnected except by the owner of the key 3 who can open or close the alarm circuit FIGS. 1, 2, 3 and 4. It is also impossible to short-circuit the assembly from the outside.

It is possible to use the battery of the independent unit to provide general ignition for the motorcycle and the safety sound alarm. The double circuit retains the advantages of being tamper-proof and impossible to short-circuit and makes it possible to increase security by preventing starting and use of the vehicle after the alarm.

Nevertheless the shapes, dimensions and arrangement of the various components may vary within the limit of the equivalents, as may the materials used for their manufacture, without thereby altering the general concept of the invention which has just been described.

I claim:

1. An electrical alarm device for motorcycles which comprises:
  a. a casing for mounting integrally on a motorcycle
  b. a key-operable switch mounted in the wall of said casing for operation by a key from the exterior, said key-operable switch having a first operable state and a second alternative operable state
  c. a mercury tilt switch mounted in said casing and positioned for non-completion of its circuit when the casing is tilted, and for completion of its circuit when the casing is upright,
  d. an electric battery disposed in said casing,
  e. an electrically operable alarm in said casing,
  f. a two-pole current outlet in the wall of said casing, said key-operable switch in said first operable state completing a circuit including said battery, said tilt switch and said electric alarm, said key-operable switch in said second operable state completing a circuit from said battery to said two-pole current outlet.

2. An electrical alarm device, as claimed in claim 1, comprising an amp-hour meter mounted in the wall of said casing, and conductors connecting said meter in parallel to said current outlet.

3. An electrical alarm device, as claimed in claim 1, in combination with a motorcycle having a frame, said casing being secured on said frame with said mercury tilt-switch disposed transversely of said frame, said mercury tilt-switch being mounted at such an angle relative to the casing and to the frame that, when the frame is moved into vertical position, the mercury tilt-switch closes.

* * * * *